Feb. 28, 1928.

L. B. KOCSIS

GARAGE

Filed Feb. 28, 1927    3 Sheets-Sheet 1

1,661,123

INVENTOR.
Louis B. Kocsis
Bryant & Lowry
ATTORNEYS.

Feb. 28, 1928.

L. B. KOCSIS 1,661,123

GARAGE

Filed Feb. 28, 1927   3 Sheets-Sheet 2

INVENTOR.
Louis B. Kocsis
BY
Bryant & Lowry
ATTORNEYS.

Feb. 28, 1928.
L. B. KOCSIS
1,661,123
GARAGE
Filed Feb. 28, 1927
3 Sheets-Sheet 3
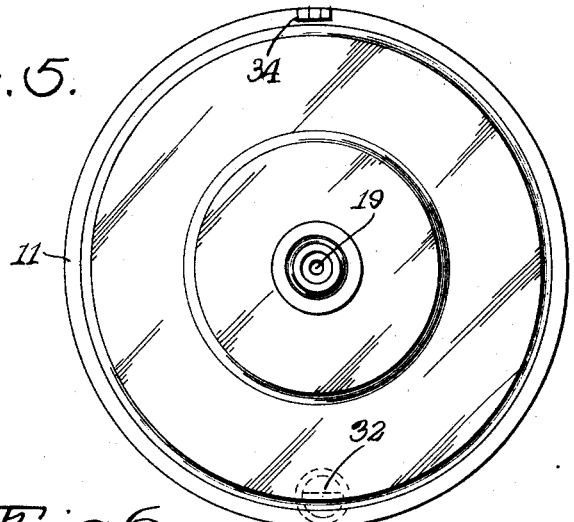
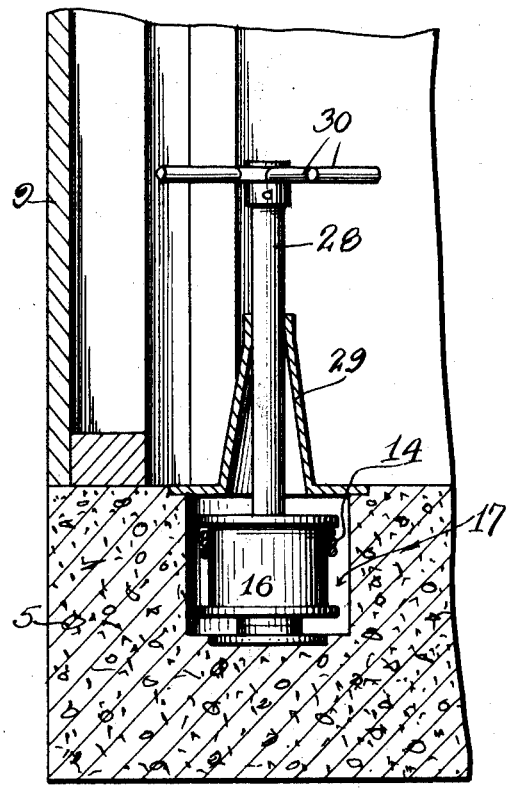
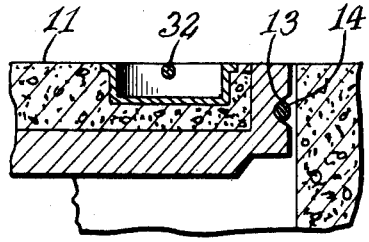
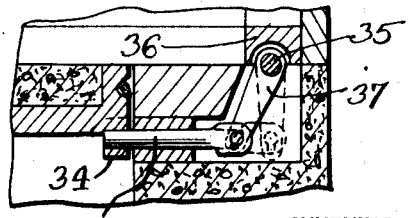
INVENTOR.
Louis B. Kocsis
BY
Bryant & Lowry
ATTORNEYS Patented Feb. 28, 1928.

1,661,123

UNITED STATES PATENT OFFICE.

LOUIS B. KOCSIS, OF FLINT, MICHIGAN.

GARAGE.

Application filed February 28, 1927. Serial No. 171,655.

This invention relates to certain new and useful improvements in garages for motor vehicles, and has more particular reference to that type of garage usually employed for private use by individual parties and adapted to accommodate a single motor vehicle.

The primary object of the invention is to provide a garage of the above kind embodying a housing of such internal size as to accommodate a vehicle over all, a turn table centrally disposed in said housing of a size to accommodate the wheel base of the vehicle, said housing having an entrance opening through which the vehicle may be driven into the housing and onto the turn table, means to actuate the turn table for positioning the vehicle thereon transversely of the housing so that it may not then be driven out of the housing, and concealed means within the housing for locking the turn table against actuation when the turn table is so positioned to dispose the vehicle transversely of the housing, whereby an unauthorized person may not position the vehicle longitudinally of the housing, thereby preventing driving of the vehicle out of the housing through the entrance opening and consequently preventing theft of said vehicle.

A further object of the invention is to provide a garage turntable apparatus of simple and durable construction.

Still another object is to provide simple and improved means for actuating the turntable from points within the garage housing.

Another object is to provide concealed locking means for the garage turntable so related to the housing structure of the garage as to render discovery thereof by a person unfamiliar with the construction, very unlikely.

Other objects will become apparent as the nature of the invention is better understood, and the same consists in the novel form, combination and arrangement of parts hereinafter more fully described, shown in the accompanying drawings and claimed.

In the drawings, wherein like reference characters indicate corresponding parts throughout the several views, Figure 1 is a front elevational view of a garage constructed in accordance with the present invention;

Figure 5 is a bottom plan view of the turntable platform;

Figure 6 is a fragmentary vertical section taken substantially upon line 6—6 of Figure 3 showing details of the turntable actuating means;

Figure 7 is an enlarged fragmentary radial section through the turntable platform and adjacent parts, taken substantially upon line 7—7 of Figure 2; and Figure 8 is an enlarged fragmentary detail sectional view showing more clearly details of the locking mechanism shown in Figure 4.

Figure 1:
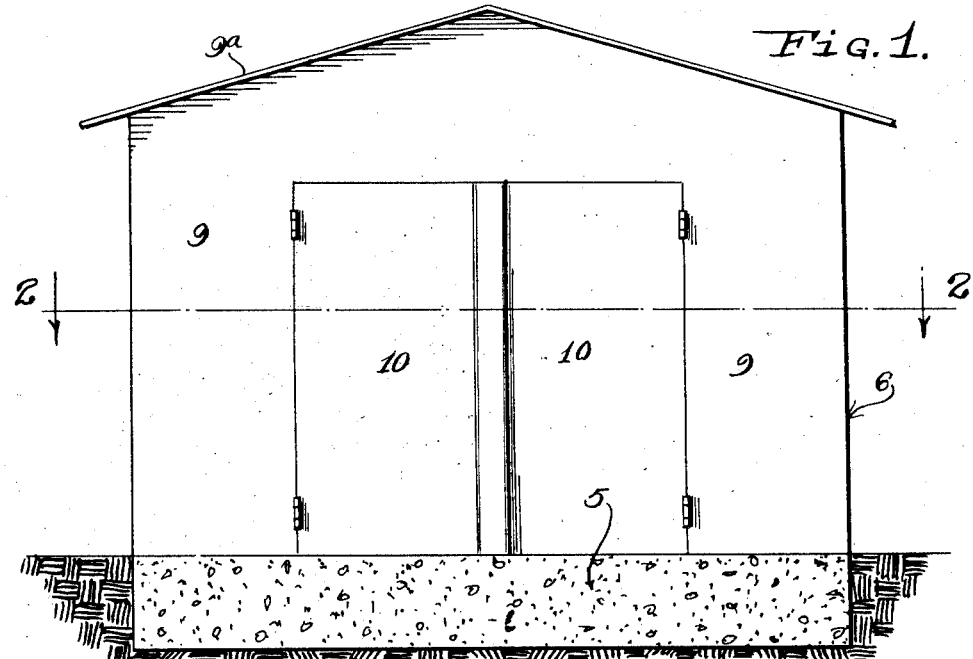

Referring more in detail to the drawings, the present garage preferably embodies a suitable foundation or floor 5 of concrete, conforming, in plan, to the shape of the housing 6 erected thereon, the housing 6 is of an internal size to accommodate the desired vehicle over all and preferably embodies a suitable frame work including sleepers or sills 7 suitably laid upon and anchored to the margin of the foundation or floor 5 and having spaced studdings 8 rising therefrom, this frame work being suitably covered by sheet metal or other sidings 9 and a suitable roof 9ª. The front wall of the garage is provided with the usual entrance opening through which the vehicle is adapted to be driven into the housing, and this opening is closed in the usual way by suitable doors 10. The garage housing is constructed of such size as to permit the vehicle to be readily driven into and out of the same when the vehicle is disposed longitudinally of the housing, but sufficiently small to prevent the vehicle from being driven out of the housing in case said vehicle is positioned transversely of the latter.

Figure 3:
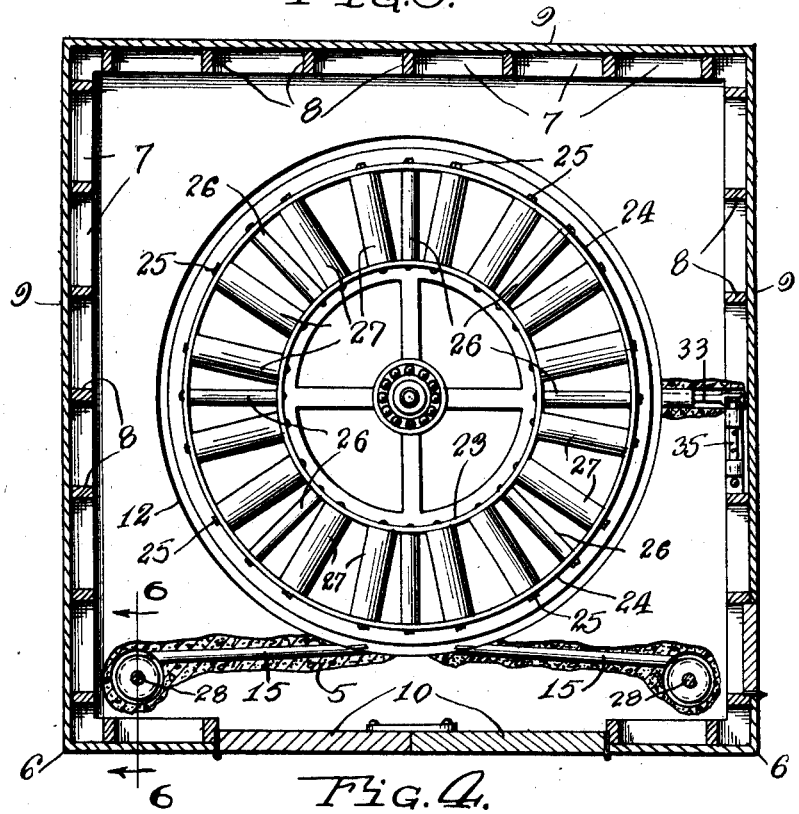
Figure 3 is a view somewhat similar to Figure 2 with the rotary platform of the turntable removed and certain parts broken away and in section to reveal details of the turntable actuating and locking means.

In order to permit the above transverse positioning of the vehicle, a turntable construction is provided within the housing including a circular turntable platform 11 centrally disposed in the housing and of a size to accommodate the wheel base of the vehicle. As shown more clearly in Figures 3 and 4, the foundation or floor 5 is formed with a central circular recess or well 12, and the platform 11 is rotatably mounted within the upper portion of this recess or well so as to have its upper surface flush with the upper surface of the foundation or floor 6. The platform may consist in a suitable metallic disk having a continuous upstanding marginal flange, and a filling of concrete placed upon the metal disk and of a thickness to have its upper surface flush with the upper edge of said flange. This will provide a desirable durable turntable platform that is suitable for use in connection with certain actuating means as will presently become apparent. Formed in the outer surface of the marginal flange of the metal part of the turntable platform is an annular groove 13, and passed about this flange within said groove is a rope or cable 14, one end portion of which extends from the turntable to a forward corner of the garage housing within the latter and crosses the other end portion of the rope or cable which extends to the other forward corner of the garage housing within the latter. These end portions of the cable extend through suitable tubular guides 15 embedded in the foundation or floor 5, and the end portions thereof are respectively attached to drums 16, one of which is journaled upon a vertical axis within a recess 17 provided in the foundation or floor adjacent and within each forward corner portion of the garage housing. It is thus apparent that upon rotating the drum 16 at one side of the doorway, the cable 14 will be wound thereon so as to cause the turntable platform 11 to be rotated a quarter of a turn, whereby a vehicle previously driven onto the turntable platform through the doorway will be positioned transversely of the garage housing. When this drum is rotated to wind the cable thereon, the other drum will be automatically turned to pay the cable therefrom, and when it is desired to return the turntable platform to normal position so as to position the vehicle again longitudinally of the garage, it is simply necessary to rotate the other drum so as to wind the cable thereon and cause it to be paid out from the first named drum.

In order to journal the platform 11 within the upper portion of the well 12, a central support 18 is anchored within the bottom of the well 12 and has an upstanding spindle which enters a central opening 19 (Fig. 5) provided in the middle disk part of the platform 11. Suitable thrust bearings 20 are interposed between the upper end of the support 18 and the bottom of the platform 11 so that rotation of the latter can be effected with comparative ease. The opening 19 enters the bottom of a relatively large recess provided centrally in the platform 11, and threaded on the spindle of the support 18 is a nut 21 which secures the platform in place.

The central recess of the platform has a cover 22 which may be displaced for facilitating access to the nut 21 in case it is desired for assembly or repair. Rigidly connected with and disposed in spaced concentric surrounding relation to the central support 18 is a circular ring 23, and surrounding this ring 23 in spaced concentric relation to the latter is a further ring 24 rigidly connected to the ring 23 at intervals by radially disposed bolts 24, the rings being maintained in properly spaced concentric relation by means of spacing sleeves 26 disposed upon the bolts between the rings. Suitably journaled at intervals between the rings 23 and 24 upon radial horizontal axes supported by said rings are supporting rollers 27 which are of such diameter as to project above the upper edges of the rings 23 and 24 and contact with the under surface of the platform 11 outwardly of the central thrust bearings 20. In this way lateral tilting of the platform is effectively prevented in all directions, and binding is eliminated so that the ease of rotation of the platform 11 is further promoted.

Each drum 16 has an upwardly projecting actuating shaft 28 which extends upwardly through and is rotatably journaled in a tubular supporting stand 29. The upper end of each shaft 28 may be equipped with a plurality of radial handles 30 or a suitable hand wheel so as to facilitate manual rotation of the drum. The counter-sunk handle device 32 embedded in the upper surface of the concrete portion of the platform 11 near the edge of the latter is simply provided to facilitate handling of the platform in assembling or removing the same for repair.

Suitable means concealed within the garage is provided for locking the platform 11 against rotation when positioned to dispose the vehicle transversely of the garage housing as mentioned above. As shown, this means consists of a sliding bolt 33 suitably mounted and embedded in the concrete foundation or floor 5 at one side of the well 12, and a depending apertured keeper lug 34 rigid with and depending from the margin of the metal platform section as shown clearly in Figures 5 and 8, the bolt 33 being adapted to enter the keeper 34 when said bolt is projected inwardly and the keeper 34 is aligned with the bolt upon shifting the platform 11 to position the vehicle transversely of the garage as mentioned. A concealed actuating means for the bolt 33 is also provided including a horizontal actuating shaft 35 journaled beneath a removable section 36 of the sill 7, provided between a pair of adjacent studs 8, and a crank arm 37 rigid with and depending from the shaft 35 and loosely connected at its lower end to the adjacent outer end of the locking bolt 33. When the sill section 36 is in place, it will be readily seen that the bolt 35 and its actuating means is completely hid from view in such manner as to not be readily discovered by a person who is not familiar with the construction of the garage. Thus, when the bolt is projected to lock the turntable platform, the latter is effectively held against rotation so that an unauthorized person may not turn the machine from its transversely disposed position relative to the garage housing, and in view thereof, the vehicle may not be driven out of the garage and its theft is accordingly effectively prevented.

Figure 2:
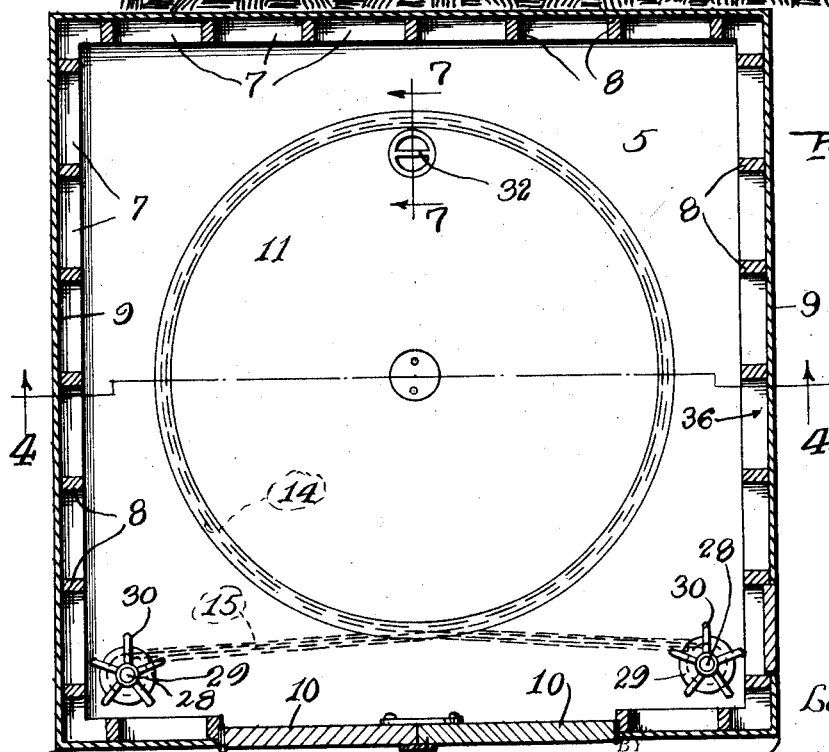
Figure 2 is a horizontal sectional view thereof taken substantially upon line 2—2 of Figure 1.
Figure 4:
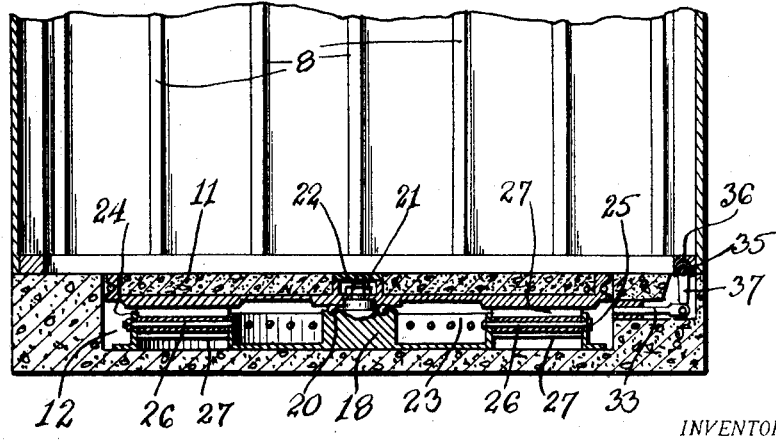
Figure 4 is a transverse vertical section taken substantially upon line 4—4 of Figure 2.

In operation, the platform is normally positioned as illustrated in Figures 1 and 4, and upon opening the doors 10, the vehicle may be readily driven into the garage housing and onto the platform 11. The drum at the right hand forward corner of the garage shown in Figure 2 is then rotated to wind the cable 14 thereon, thus turning the platform 11 one quarter of a complete revolution so as to position the vehicle transversely of the garage and bring the keeper 34 in registry with the bolt 33. The removable section or cover 36 is then removed and the shaft 35 suitably turned so as to project the bolt 33 into the keeper 34 and thereby lock the platform against actuation. The section or cover 36 is then replaced, and the vehicle is effectively protected against theft because of inability of an unauthorized person to actuate the turntable and position the vehicle longitudinally of the garage as is necessary before the vehicle can be driven out of the garage housing. When an authorized person wishes to remove the vehicle from the garage it is simply necessary to remove the cover 36 and actuate the shaft 39 so as to release bolt 33, whereupon the drum 16 at the left hand corner of the garage as shown in Figure 2 may be rotated to wind the cable 14 thereon and return the platform 11 to normal position with the vehicle positioned longitudinally of the garage. The vehicle may then be driven backwardly through the doorway out of the garage housing.

From the foregoing description it is believed that the construction and operation as well as the advantages of the present invention will be readily understood and appreciated by those skilled in the art.

Minor changes may be made without departing from the spirit and scope of the invention as claimed.

What I claim as new is:—

1. In a garage for a motor vehicle, the combination of a housing of an internal size to closely accommodate the vehicle over all, a turntable centrally disposed in said housing of a size to accommodate the wheel base of the vehicle, means within the housing for locking the turntable against rotation when positioned to dispose the vehicle transversely of the housing, and means for concealing said locking means.

2. In a garage for a motor vehicle, the combination of a housing of an internal size to closely accommodate the vehicle over all, a turntable centrally disposed in said housing of a size to accommodate the wheel base of the vehicle, means within the housing for locking the turntable against rotation when positioned to dispose the vehicle transversely of the housing, and means for concealing said locking means, a foundation floor for said housing, said housing embodying a frame having sills laid on the foundation floor, said locking means embodying a locking element concealed in the floor and an actuating element for the locking element disposed beneath a portion of one of the sills, said portion of the sill being displaceable to permit access to the actuating element.

3. In a garage for a motor vehicle, the combination of a housing of an internal size to closely accommodate the vehicle over all, a turntable centrally disposed in said housing of a size to accommodate the wheel base of the vehicle, means within the housing for locking the turntable against rotation when positioned to dispose the vehicle transversely of the housing, and means for concealing said locking means, including a displaceable part of an element of the garage construction.

4. In a garage for a motor vehicle, the combination of a housing of an internal size to closely accommodate the vehicle over all, a turntable centrally disposed in said housing of a size to accommodate the wheel of the vehicle, means within the housing for locking the turntable against rotation when positioned to dispose the vehicle transversely of the housing, and means for concealing said locking means, including a displaceable part of an element of the housing construction.

5. In a garage for a motor vehicle, the combination of a housing of an internal size to closely accommodate the vehicle over all, a turntable centrally disposed in said housing of a size to accommodate the wheel base of the vehicle, means within the housing for locking the turntable against rotation when positioned to dispose the vehicle transversely of the housing, and means for concealing said locking means, said housing including a skeleton frame, said concealing means including a displaceable part of an element of said frame.

6. In a garage for a motor vehicle, the combination of a housing of an internal size to closely accommodate the vehicle over all, a turntable centrally disposed in said housing of a size to accommodate the wheel base of the vehicle, means within the housing for locking the turntable against rotation when positioned to dispose the vehicle transversely of the housing, and means for concealing said locking means, said housing including a skeleton frame embodying lower sills, said concealing means including a displaceable part of one of said sills.

7. In a garage for motor vehicles, a foundation floor formed with a central circular recess, a housing erected thereon and having a front doorway, a circular turntable platform journaled in said recess, a recess being further formed in the floor adjacent and to each side of the doorway, a drum journaled upon a vertical axis within each of said second named recesses, and having upwardly projecting actuating shafts, and an operating cable for the platform passed about the peripheral edge of the latter and having end portions crossed at the front of said central recess and extended through the floor to the respective drums.

8. In a garage for motor vehicles, a foundation floor formed with a central circular recess, a housing erected thereon and having a front doorway, a circular turntable platform journaled in said recess, a recess being further formed in the floor adjacent and to each side of the doorway, a drum journaled upon a vertical axis within each of said second named recesses, and having upwardly projecting actuating shafts, an operating cable for the platform passed about the peripheral edge of the latter and having end portions crossed at the front of said central recess and extended through the floor to the respective drums, and tubular guides for the end portions of the cable embedded in said floor.

9. A garage turntable comprising a central support having an upstanding central spindle, a ring rigid with and in spaced concentric relation to and surrounding said support, a second ring spaced from and surrounding the first ring, means rigidly connecting said rings in spaced concentric relation, rollers journaled between said rings upon radial horizontal axes supported by the rings, a rotary circular platform disposed above the support and rings and resting at its outer part upon said rollers, said platform rotatably receiving and securing on said spindle, thrust bearings interposed between the support and the central part of the platform about said spindle, said platform having a central recess provided with a displaceable cover and into which the spindle projects, and securing means for the platform associated with the spindle within the latter recess.

In testimony whereof I affix my signature.

LOUIS B. KOCSIS.